United States Patent
Choi

(10) Patent No.: US 11,661,054 B2
(45) Date of Patent: *May 30, 2023

(54) CONTROL DEVICE AND METHOD FOR FORWARD COLLISION AVOIDANCE IN VEHICLE

(71) Applicant: HYUNDAI MOBIS Co., Ltd., Seoul (KR)

(72) Inventor: Tae Keun Choi, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/497,272

(22) Filed: Oct. 8, 2021

(65) Prior Publication Data

US 2022/0024453 A1 Jan. 27, 2022

Related U.S. Application Data

(63) Continuation of application No. 16/460,691, filed on Jul. 2, 2019, now Pat. No. 11,173,899.

(30) Foreign Application Priority Data

Jul. 3, 2018 (KR) .......................... 10-2018-0076909

(51) Int. Cl.
*B60W 30/09* (2012.01)
(52) U.S. Cl.
CPC .......... *B60W 30/09* (2013.01); *B60W 2420/52* (2013.01); *B60W 2510/101* (2013.01);
(Continued)
(58) Field of Classification Search
CPC ............. B60W 30/09; B60W 2554/00; B60W 2420/52; B60W 2510/101; B60W 2520/10; B60W 2520/28
See application file for complete search history.

(56) References Cited

U.S. PATENT DOCUMENTS

| 10,908,271 B2 * | 2/2021 | Watanabe .............. G01S 13/04 |
| 2007/0219695 A1 * | 9/2007 | Chiu ....................... F16H 59/44 |
| | | 701/300 |

(Continued)

FOREIGN PATENT DOCUMENTS

| CN | 105492285 A * | 4/2016 | ............ B60W 10/06 |
| EP | 0952459 B1 * | 5/2011 | ........... G01S 13/931 |

(Continued)

OTHER PUBLICATIONS

Mai Rudolf, Machine Translation of EP 0952459 B1, 2011 (Year: 2011).*

(Continued)

*Primary Examiner* — Peter D Nolan
*Assistant Examiner* — Kenneth M Dunne
(74) *Attorney, Agent, or Firm* — Morgan, Lewis & Bockius LLP

(57) ABSTRACT

The control device for forward collision avoidance in a vehicle includes a forward object determination unit configured to recognize an object in front of the vehicle and to determine an attribute of the recognized object, a gear position detection unit configured to detect a gear position of the vehicle, and a forward collision-avoidance assist (FCA) control unit configured to finally determine the attribute of the object determined by the forward object determination unit according to the gear position input from the gear position detection unit and to set an FCA control range based on the finally determined object attribute.

10 Claims, 2 Drawing Sheets

(52) U.S. Cl.
CPC ..... *B60W 2520/10* (2013.01); *B60W 2520/28* (2013.01); *B60W 2554/00* (2020.02)

(56) References Cited

U.S. PATENT DOCUMENTS

| | | |
|---|---|---|
| 2016/0185345 A1 | 6/2016 | Sasabuchi et al. |
| 2016/0202351 A1 | 7/2016 | Uotsu |
| 2017/0320433 A1 | 11/2017 | Zhang et al. |

FOREIGN PATENT DOCUMENTS

| | | |
|---|---|---|
| ES | 2 383 469 | 6/2012 |
| GB | 2 404 038 A | 1/2005 |
| JP | 2018-049496 A | 3/2018 |
| KR | 10-2017-0107722 A | 9/2017 |
| KR | 10-2018-0066524 A | 6/2018 |
| WO | 03/029045 A2 | 4/2003 |

OTHER PUBLICATIONS

Iwata Y, machine translations of CN 105492285 A, 2016 (Year: 2016).*
Korean Office Action dated Jul. 12, 2022, issued in corresponding Korean Patent Application No. 10-2018-0076909.
Notice of Allowance issued in corresponding U.S. Appl. No. 16/460,691 dated Jul. 21, 2021.
Office Action issued in corresponding U.S. Appl. No. 16/460,691 dated Apr. 13, 2021.

\* cited by examiner

CONTROL DEVICE AND METHOD FOR FORWARD COLLISION AVOIDANCE IN VEHICLE

CROSS-REFERENCE TO RELATED APPLICATION

This application is a continuation application of U.S. patent application Ser. No. 16/460,691, filed on Jul. 2, 2019, which claims the benefit of Korean Patent Application No. 10-2018-0076909 filed on Jul. 3, 2019, the entire contents of each are hereby incorporated by reference.

BACKGROUND

1. Technical Field

Embodiments of the present disclosure relate to a control device and method for forward collision avoidance in a vehicle, and more particularly, to a control device and method for forward collision avoidance in a vehicle, which determine a forward object attribute by reflecting gear position information for forward collision-avoidance assist (FCA) control in an FCA system using a radar sensor as a single sensor.

2. Related Art

In general, the vehicle is a device that drives its wheels to transport people, cargoes, or the like from one place to another place. Examples of the vehicle include a train as well as a two-wheeled vehicle such as a motorcycle and a four-wheeled vehicle such as a sedan.

In order to increase the safety and convenience of users who utilize a vehicle in recent years, the development of technology for combining a variety of sensors and electronic devices with the vehicle has been accelerated.

In particular, the vehicle is equipped with systems that provide various functions (e.g., forward collision-avoidance assist (FCA), smart cruise control (SCC), lane keeping assistance (LKA), autonomous emergency braking (AEB), highway drive assistance (HAD), and so on) developed for the convenience of user operation.

Meanwhile, in the development of these systems, a system has been developed that minimizes the number of sensors to be used for securing a product's competitiveness.

Especially, in the case of an FCA system, the system has conventionally been developed using the fusion of a camera and a radar, whereas the system has recently been developed using only a single sensor such as a radar or a camera for application to small vehicles. The FCA system is also referred to as an autonomous emergency braking (AEB) system.

However, if the system is configured with only the single sensor, there are more restrictions than when configuring the system using two or more sensors.

Conventionally, the FCA system configured using only the radar recognizes presence of a forward object using radio waves of the radar and obtains the speed and distance of a vehicle relative to the forward object using the wheel speed of the vehicle as basic information. However, it is difficult to identify the forward/backward direction of the vehicle using the wheel speed. For example, when the vehicle moves backward, the attribute of the object may be erroneously determined. That is, the vehicle moves backward so that the attribute of the object is changed from a stationary object to a moving object, which may lead to determining, as a control target, and performing erroneous control on an object that is not a vehicle, namely, the control target.

The foregoing is disclosed in Korean Patent Application Publication No. 10-2018-0066524 (published on Jun. 19, 2018), entitled "Vehicle and Control Method thereof".

SUMMARY

Various embodiments are directed to a control device and method for forward collision avoidance in a vehicle, capable of preventing a forward object attribute from being erroneously determined in a neutral situation by reflecting gear position information for forward collision-avoidance assist (FCA) control in an FCA system using a radar sensor as a single sensor.

In an embodiment, there is provided a control device for forward collision avoidance in a vehicle, which includes a forward object determination unit configured to recognize an object in front of the vehicle and to determine an attribute of the recognized object, a gear position detection unit configured to detect a gear position of the vehicle, and a forward collision-avoidance assist (FCA) control unit configured to finally determine the attribute of the object determined by the forward object determination unit according to the gear position input from the gear position detection unit and to set an FCA control range based on the finally determined object attribute.

The FCA control unit may receive a current gear position from the gear position detection unit and a gear position at the time when the object is recognized by the forward object determination unit.

When the object is recognized by the forward object determination unit and the current gear position is in an N-range, the FCA control unit may finally determine the object attribute according to the gear position at the time when the object is recognized.

When the attribute of the object recognized by the forward object determination unit is a moving object, the current gear position is in the N-range, and the gear position at the time when the moving object is recognized is in the N-range, the FCA control unit may change the attribute of the moving object to a stationary object. On the other hand, when the attribute of the object recognized by the forward object determination unit is a moving object, the current gear position is in the N-range, and the gear position at the time when the moving object is recognized is not in the N-range, the FCA control unit may maintain the attribute of the moving object as a moving object.

The forward object determination unit may receive detected values from a radar sensor for recognizing the object in front of the vehicle and a wheel speed sensor for measuring a wheel speed of the vehicle, and calculate a speed and distance of the vehicle relative to the recognized object through the radar sensor to determine the object attribute based on the same.

In an embodiment, there is provided a control method for forward collision avoidance in a vehicle, which includes inputting a result of determining an object in front of a vehicle recognized by a forward object determination unit to an FCA control unit, inputting a gear position of the vehicle from a gear position detection unit to the FCA control unit, finally determining an attribute of the object, recognized by the forward object determination unit according to the gear position input from the gear position detection unit, by the FCA control unit, and setting an FCA control range, based on the finally determined object attribute, by the FCA control unit.

The FCA control unit may receive a current gear position from the gear position detection unit and a gear position at the time when the object is recognized by the forward object determination unit.

In the finally determining an attribute of the object, when the object is recognized by the forward object determination unit and the current gear position is in an N-range, the FCA control unit may finally determine the object attribute according to the gear position at the time when the object is recognized.

In the finally determining an attribute of the object, when the attribute of the object recognized by the forward object determination unit is a moving object, the current gear position is in the N-range, and the gear position at the time when the moving object is recognized is in the N-range, the FCA control unit may change the attribute of the moving object to a stationary object. On the other hand, when the attribute of the object recognized by the forward object determination unit is a moving object, the current gear position is in the N-range, and the gear position at the time when the moving object is recognized is not in the N-range, the FCA control unit may maintain the attribute of the moving object as a moving object.

In the inputting a result of determining an object in front of a vehicle, the forward object determination unit may receive detected values from a radar sensor for recognizing the object in front of the vehicle and a wheel speed sensor for measuring a wheel speed of the vehicle, and calculate a speed and distance of the vehicle relative to the recognized object through the radar sensor to determine the object attribute based on the same.

As apparent from the above description, the control device and method for forward collision avoidance in a vehicle according to the exemplary embodiments of the present invention are effective in that it is possible to prevent the forward object attribute from being erroneously determined in the neutral situation and to prevent the malfunction of the vehicle due to the erroneous determination of the object attribute since they finally determine the object attribute by further reflecting the gear position information to the result of determining the object attribute through the radar sensor for FCA control in the FCA system using the radar sensor as a single sensor.

Therefore, the control device and method for forward collision avoidance in a vehicle according to the exemplary embodiments of the present invention are effective in that it is possible to improve the control accuracy of the FCA system and enhance user's satisfaction and product reliability.

DETAILED DESCRIPTION

Figure 1:
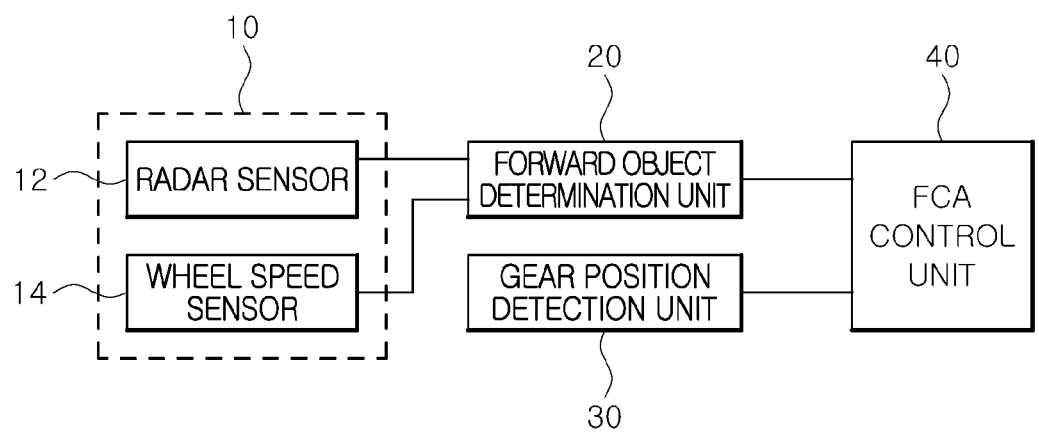
FIG. 1 is a block diagram illustrating a control device for forward collision avoidance in a vehicle according to an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, a control device and method for forward collision avoidance in a vehicle will be described below with reference to the accompanying drawings through various examples of embodiments. It should be noted that the drawings are not necessarily to scale and may be exaggerated in thickness of lines or sizes of components for clarity and convenience of description.

Furthermore, the terms as used herein are terms defined in consideration of functions of the invention and may change depending on the intention or practice of a user or an operator. Therefore, these terms should be defined based on the overall disclosures set forth herein.

FIG. 1 is a block diagram illustrating a control device for forward collision avoidance in a vehicle according to an embodiment of the present invention. The control device for forward collision avoidance in a vehicle will be described below with reference to the drawing.

As illustrated in FIG. 1, the control device for forward collision avoidance in a vehicle according to the embodiment of the present invention includes a forward sensor unit 10, a forward object determination unit 20, a gear position detection unit 30, and a forward collision-avoidance assist (FCA) control unit 40.

First, the embodiment relates to a radar-only FCA system. In other words, the embodiment is aimed at determining an object attribute in an FCA system that recognizes a forward object using only a radar sensor 12 as a forward sensor, determines the speed and distance of a vehicle relative to the recognized object through a wheel speed sensor 14 previously mounted to the vehicle to inform a driver of a risk by a warning message, a warning sound, or the like in the event of a collision risk, and actuates a brake when necessary to reduce damage.

The forward sensor unit 10 includes a radar sensor 12. In the embodiment, the forward sensor unit 10 is illustrated as including a wheel speed sensor 14 in FIG. 1 in that the attribute of a detected object in front of the vehicle is determined through values detected by the radar sensor 12 and the wheel speed sensor 14. However, the wheel speed sensor 14 may be a separate sensor previously mounted to the vehicle. That is, the wheel speed sensor 14 may be included in a sensor means for providing vehicle signal information.

The forward object determination unit 20 recognizes an object in front of the vehicle and determines the attribute of the recognized object. That is, the forward object determination unit 20 may receive detected values from the radar sensor 12 for recognizing an object in front of the vehicle and the wheel speed sensor 14 for measuring the wheel speed of the vehicle, and calculate the speed and distance of the vehicle relative to the recognized object through the radar sensor 12 to determine the object attribute based on the same.

In this case, the wheel speed sensor 14 may detect only the wheel speed of the vehicle, but may not determine the forward/backward direction of the wheel of the vehicle. Accordingly, in the embodiment, the forward object detection unit 20 may determine the attribute of the recognized object based on the gear position information of the vehicle detected by the gear position detection unit 30.

The gear position detection unit 30 detects the gear position of the vehicle. The gear position detection unit 30 may detect a current gear position of the vehicle and a gear position at the time when an object is recognized by the forward object determination unit 20, to provide them to the FCA control unit 40.

For example, when the vehicle is pushed backward on the slope in the state in which the current gear position of the vehicle is in an N-range (neutral range), a stationary object may be erroneously determined as a moving object due to the wheel speed detected by the wheel speed sensor 14, thereby causing FCA control to be erroneously performed.

Thus, in the embodiment, the forward object determination unit 20 recognizes an object in front of the vehicle through the radar sensor 12, determines the attribute of the recognized object through the wheel speed sensor 14, and reflects the gear position information of the vehicle to the determined attribute to finally determine the attribute of the object.

As described above, the FCA control unit 40 may perform FCA control after it finally determines the attribute of the object determined by the forward object determination unit 20 according to the gear position input from the gear position detection unit 30 and sets an FCA control range based on the finally determined object attribute.

In the embodiment, the FCA control unit 40 may receive the current gear position of the vehicle from the gear position detection unit 30 and the gear position at the time when the object is recognized by the forward object determination unit 20, as described above. That is, the FCA control unit 40 may finally determine the attribute of the recognized object according to the current gear position and the gear position at the time when the object is recognized.

In the embodiment, when the object is recognized by the forward object determination unit 20, the FCA control unit 40 checks whether the current gear position is in the N-range. In this case, when the current gear position is in the N-range, the FCA control unit 40 may finally determine the object attribute according to the gear position at the time when the object is recognized. This is to prevent the attribute of the object from being misrecognized when the current gear position is in the N-range.

More specifically, when the attribute of the object recognized by the forward object determination unit 20 is a moving object, the current gear position is in the N-range, and the gear position at the time when the moving object is recognized is in the N-range, the FCA control unit 40 may change the attribute of the moving object to a stationary object and finally determine the object attribute. On the other hand, when the attribute of the object recognized by the forward object determination unit 20 is a moving object, the current gear position is in the N-range, and the gear position at the time when the moving object is recognized is not in the N-range, the FCA control unit 40 may maintain the attribute of the moving object as a moving object and finally determine the object attribute.

In the embodiment, when a moving object is recognized in front of the vehicle, there is a possibility that the attribute of the moving object is misrecognized when the current gear position is in the N-range. Therefore, the gear position at the time when the moving object is recognized is further checked.

In other words, when the gear position at the time when the moving object is recognized is not in the N-range even though the current gear position is in the N-range, the FCA control unit 40 may determine that the object attribute is properly determined, thereby maintaining the object attribute to perform the FCA control. When the gear position at the time point when the moving object is recognized is in the N-range, the FCA control unit 40 determines that, as a vehicle moves backward in a neutral situation, the attribute of the stationary object is changed to a moving object, namely, the stationary object that is not an FCA control target is misrecognized as a moving object (e.g., another vehicle) that is an FCA control target. Thus, the FCA control unit 40 changes the attribute of the moving object to perform FCA control.

In the embodiment, it is described that the FCA control unit 40 checks whether the attribute of the object recognized by the forward object determination unit 20 is a moving object and then checks the current gear position of the vehicle. However, the FCA control unit 40 may check the current gear position of the vehicle and then check whether the attribute of the object recognized by the forward object determination unit 20 is a moving object. The present invention is not limited to the above order.

Figure 2:
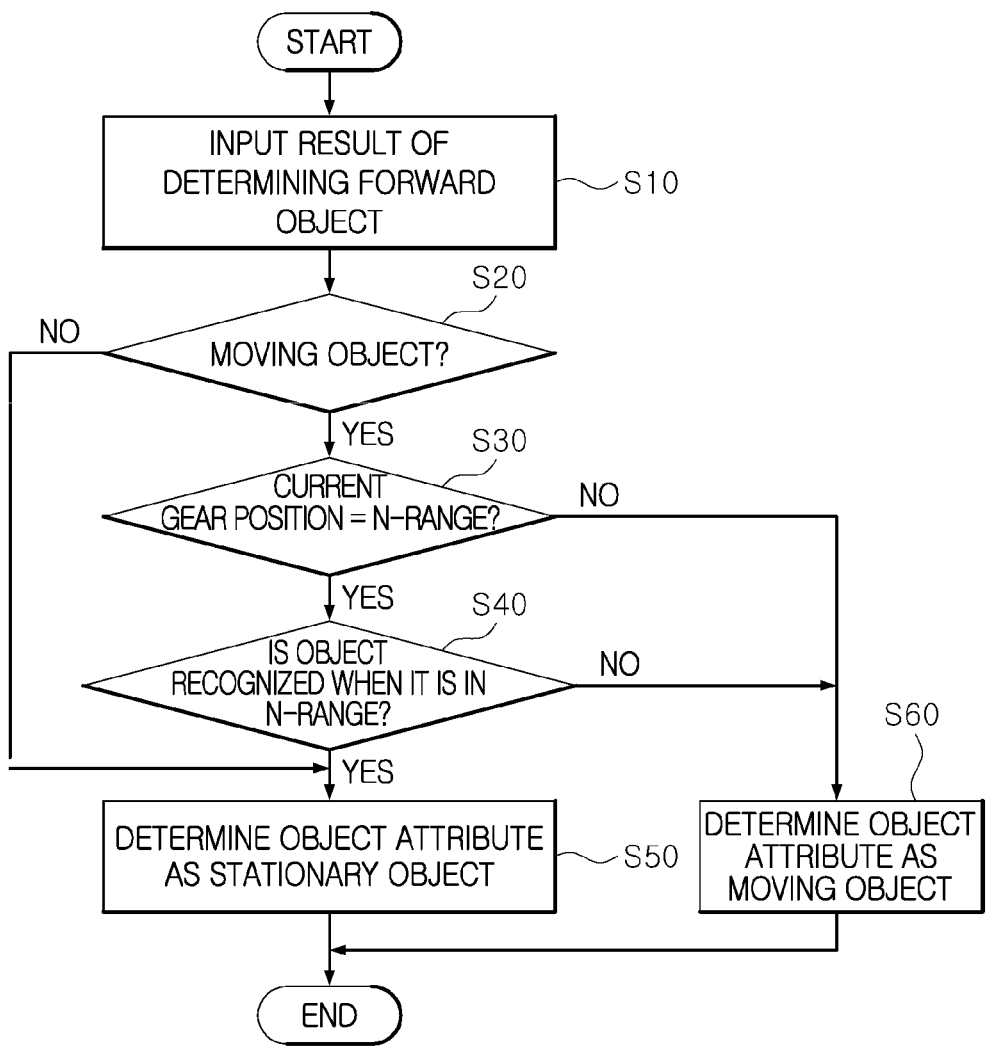
FIG. 2 is a flowchart illustrating a control method for forward collision avoidance in a vehicle according to an embodiment of the present invention.

FIG. 2 is a flowchart illustrating a control method for forward collision avoidance in a vehicle according to an embodiment of the present invention. The control method for forward collision avoidance in a vehicle will be described below with reference to the drawing.

As illustrated in FIG. 2, the control method for forward collision avoidance in a vehicle according to the embodiment of the present invention includes inputting a result of determining an object in front of a vehicle recognized by a forward object determination unit 20 to an FCA control unit 40 (S10).

In this case, the forward object determination unit 20 recognizes the object in front of the vehicle and determines the attribute of the recognized object. That is, the forward object determination unit 20 may receive detected values from a radar sensor 12 for recognizing the object in front of the vehicle and a wheel speed sensor 14 for measuring the wheel speed of the vehicle, and calculate the speed and distance of the vehicle relative to the recognized object through the radar sensor 12 to determine the object attribute based on the same.

Next, the FCA control unit 40 checks whether the attribute of the object recognized by the forward object determination unit 20 in step S10 is a moving object (S20).

In this case, when the attribute of the object recognized by the forward object determination unit 20 is not a moving object, namely, when it is a stationary object, the FCA control unit 40 may maintain the attribute of the recognized object as a stationary object and finally determine the object attribute (S50). However, in the embodiment, when the attribute of the object recognized by the forward object determination unit 20 is a stationary object, the step of finally determining the object attribute may also be omitted because it is a stationary object regardless of the gear position.

On the other hand, when it is checked that the attribute of the object recognized by the forward object determination unit 20 is the moving object in step S20, the FCA control unit 40 checks whether the current gear position is in an N-range (S30).

When it is checked in step S30 that the current gear position is in the N-range, the FCA control unit 40 checks whether the gear position at the time when the object is recognized by the forward object determination unit 20 is in the N-range (S40).

In this case, the FCA control unit 40 may receive the current gear position of the vehicle from a gear position detection unit 30 and the gear position at the time when the object is recognized by the forward object determination unit 20. That is, in the embodiment, the FCA control unit 40 may finally determine the attribute of the recognized object according to the current gear position and the gear position at the time when the object is recognized. In the embodiment, when the object is recognized by the forward object determination unit 20, the FCA control unit 40 checks whether the current gear position is in the N-range. When the current gear position is in the N-range, the FCA control unit 40 may finally determine the object attribute according to the gear position at the time when the object is recognized. This is to prevent the attribute of the object from being misrecognized when the current gear position is in the N-range.

In summary, when it is checked in step S20 that the attribute of the object recognized by the forward object determination unit 20 is the moving object, it is checked in step S30 that the current gear position is in the N-range, and it is checked in step S40 that the gear position at the time when the moving object is recognized is in the N-range, the FCA control unit 40 changes the attribute of the moving object to a stationary object and finally determines the object attribute (S50).

That is, when the gear position at the time point when the moving object is recognized is in the N-range, the FCA control unit 40 determines that, as a vehicle moves backward in a neutral situation, the attribute of the stationary object is changed to a moving object, namely, the stationary object that is not an FCA control target is misrecognized as a moving object (e.g., another vehicle) that is an FCA control target. Thus, the FCA control unit 40 may change the attribute of the moving object to perform FCA control.

On the other hand, when it is checked in step S20 that the attribute of the object recognized by the forward object determination unit 20 is the moving object, it is checked in step S30 that the current gear position is in the N-range, and it is checked in step S40 that the gear position at the time when the moving object is recognized is not in the N-range, the FCA control unit 40 may maintain the attribute of the moving object as a moving object and finally determine the object attribute (S60).

In the embodiment, when the moving object is recognized in front of the vehicle, there is a possibility that the attribute of the moving object is misrecognized when the current gear position is in the N-range. Therefore, the gear position at the time when the moving object is recognized is further checked.

In other words, when it is determined in step S40 that the gear position at the time when the moving object is recognized is not in the N-range even though it is checked in step S30 that the current gear position is not in the N-range or it is checked in step S30 that the current gear position is in the N-range, the FCA control unit 40 may determine that the object attribute is properly determined, thereby maintaining the object attribute as the moving object to perform the FCA control.

In the embodiment, when the gear position at the time when the object is recognized by the forward object determination unit 20 is not in the N-range, it is possible to maintain the attribute of the object recognized by the forward object determination unit 20 regardless of the current gear position. In addition, even when the current gear position is not in the N-range, it is possible to maintain the attribute of the object recognized by the forward object determination unit 20 regardless of the time when the object is recognized by the forward object determination unit 20.

Meanwhile, although the FCA system is described as an example in the embodiment, the present invention may be applied to various systems (e.g., smart cruise control (SCC), lane keeping assistance (LKA), autonomous emergency braking (AEB), highway drive assistance (HAD), and so on) developed for the convenience of user operation.

As described above, the control device and method for forward collision avoidance in a vehicle according to the exemplary embodiments of the present invention are effective in that it is possible to prevent the forward object attribute from being erroneously determined in the neutral situation and to prevent the malfunction of the vehicle due to the erroneous determination of the object attribute since they finally determine the object attribute by further reflecting the gear position information to the result of determining the object attribute through the radar sensor for FCA control in the FCA system using the radar sensor as a single sensor.

Therefore, the control device and method for forward collision avoidance in a vehicle according to the exemplary embodiments of the present invention are effective in that it is possible to improve the control accuracy of the FCA system and enhance user's satisfaction and product reliability.

While various embodiments have been described above, it will be understood by those skilled in the art that the embodiments described are by way of example only. It will be apparent to those skilled in the art that various modifications and other equivalent embodiments may be made without departing from the spirit and scope of the disclosure.

Accordingly, the true technical protection scope of the invention should be defined by the appended claims.

What is claimed is:

1. A control device for forward collision avoidance in a vehicle, comprising:
   a forward object determination unit configured to recognize an object in front of the vehicle and to determine an attribute of the recognized object;
   a gear position detection unit configured to detect a gear position of the vehicle; and
   a forward collision-avoidance assist (FCA) control unit configured to determine whether the attribute of the recognized object is a moving object,
   in response to a determination that the attribute of the recognized object is the moving object, the FCA control unit configured to determine whether a current gear position and a gear position at a time when the object is recognize are in a N-range,
   in response to a determination whether the current gear position and the gear position at the time when the object is recognized are in the N-range, the FCA control unit configured to update the attribute of the recognized object and to set an FCA control range based on the finally determined attribute.

2. The control device according to claim 1, wherein in response to a determination that the current gear position and the gear position at the time when the object is recognized are in the N-range, the FCA control unit updates the attribute of the recognized object by changing the attribute of the recognized object to a stationary object.

3. The control device according to claim 1, wherein in response to a determination that the current gear position is in the N-range and the gear position at the time when the object is recognized is not in the N-range, the FCA control unit updates the attribute of the recognized object by maintaining the attribute of the recognized object as a moving object.

4. The control device according to claim 1, wherein in response to a determination that the current gear position is not in the N-range, the FCA control unit changes the attribute of the recognized object to a stationary object.

5. The control device according to claim 1, wherein the forward object determination unit receives detected values from a radar sensor for recognizing the object in front of the vehicle and a wheel speed sensor for measuring a wheel speed of the vehicle, and calculates a speed and distance of the vehicle relative to the recognized object through the radar sensor to determine the object attribute based on the same.

6. A control method for forward collision avoidance in a vehicle, comprising:
   inputting a result of determining an object in front of a vehicle recognized by a forward object determination unit to an FCA control unit;
   inputting a gear position of the vehicle from a gear position detection unit to the FCA control unit;
   determining whether the attribute of the recognized object is a moving object,
   in response to a determination that the attribute of the recognized object is the moving object, determining whether a current gear position and a gear position at a time when the object is recognize are in a N-range,
   in response to a determination whether the current gear position and the gear position at the time when the object is recognized are in the N-range, updating the attribute of the recognized object; and
   setting an FCA control range based on the finally determined attribute.

7. The control method according to claim 6, wherein in response to a determination that the current gear position and the gear position at the time when the object is recognized are in the N-range, the attribute of the recognized object is updated by changing the attribute of the recognized object to a stationary object.

8. The control method according to claim 6, wherein in response to a determination that the current gear position is in the N-range and the gear position at the time when the object is recognized is not in the N-range, the attribute of the recognized object is updated by maintaining the attribute of the recognized object as a moving object.

9. The control method according to claim 6, wherein recognized in response to a determination that the current gear position is not in the N-range, the attribute of the recognized object is updated by changing the attribute of the recognized object to a stationary object.

10. The control method according to claim 6, wherein in the inputting a result of determining an object in front of a vehicle, the forward object determination unit receives detected values from a radar sensor for recognizing the object in front of the vehicle and a wheel speed sensor for measuring a wheel speed of the vehicle, and calculates a speed and distance of the vehicle relative to the recognized object through the radar sensor to determine the object attribute based on the same.

* * * * *